United States Patent [19]

Case et al.

[11] 3,775,571

[45] Nov. 27, 1973

[54] MAGNETIC HEADS

[75] Inventors: Derek Frank Case, Sunbury-on-Thames; Kenneth Stammers, Woking, both of England

[73] Assignee: International Computers Limited, Putney, London, England

[22] Filed: Apr. 28, 1972

[21] Appl. No.: 248,548

[30] Foreign Application Priority Data

May 26, 1971 Great Britain .................. 17,225/71

[52] U.S. Cl. ..... 179/100.2 C, 29/603, 340/174.1 F, 346/74 MC

[51] Int. Cl. .......................... G11b 5/42, G11b 5/22

[58] Field of Search .............. 179/100.2 C, 100.2 P; 340/174.1 F; 346/74 MC; 29/603

[56] References Cited

UNITED STATES PATENTS

| | | | |
|---|---|---|---|
| 3,308,450 | 3/1967 | Bourdon et al. | 179/100.2 P |
| 3,670,112 | 6/1972 | Ruszczyk et al. | 179/100.2 P |
| 3,584,378 | 6/1971 | Duinker et al. | 340/174.1 F |
| 3,177,495 | 4/1965 | Felts | 179/100.2 P |
| 3,335,412 | 8/1967 | Matsumoto | 346/74 MC |
| 3,665,436 | 5/1972 | Murray et al. | 346/74 MC |

*Primary Examiner*—Vincent P. Canney
*Assistant Examiner*—Alfred H. Eddelman
*Attorney*—Hane, Baxley & Spiecens

[57] ABSTRACT

To offset damage to the pole face surfaces of ferrite head blocks of magnetic transducing heads which are easily susceptible to wear and impact damage. The head block is reinforced by providing a reinforcing member surrounding the pole face surface such that one surface of the reinforcing member provides a surface co-extensive with the pole face surface, the combined area of the co-extensive surfaces being greater than the cross sectional area of the head block providing the pole face surface.

6 Claims, 2 Drawing Figures

MAGNETIC HEADS

BACKGROUND OF THE INVENTION

1. Field of the Invention

This invention relates to magnetic heads and methods of manufacture therefor.

The requirements for high data rates from digital magnetic storage devices, such as a magnetic disc file, necessitates the use of magnetic reading/recording heads which will operate at high frequencies with high digit packing densities. The only heads which can provide these characteristics are of very small physical size and are made of a magnetic ferrite material. In order to achieve the required packing density, the pole face of the head has to be run actually in contact with the recording medium, or with a very small uniform separation. Ferrite materials are easily damaged by wear or impact. Damage to a head of such small physical size is liable to alter its characteristics to such an extent that it is not usable.

2. Description of the Invention

It has previously been proposed to reinforce larger heads made of ferrite material by applying a layer of glass to parts of the head structure. In one proposal the glass was applied at the back of the operative gap. In another proposal, the edges of the head were chamfered to provide a pole area which was smaller than the area of the main body of the head and sufficient reinforcing glass was applied to the chamfered edges by dipping to build-up the pole area to that of the main body.

It has been found that this form of reinforcement is unsatisfactory for use with the small heads used in high digit packing density recording applications. Firstly, the design of such heads is such that they cannot be readily chamfered to provide suitable surfaces for taking the dipped glass reinforcement. Secondly, the thickness of the glass layer is appreciable as compared with the dimensions of the head, so that the dimensions of the glass layer would need to be very accurately controlled to ensure an acceptable degree of uniformity between heads during manufacture.

The head structure and manufacturing methods proposed heretofor could not achieve the necessary accuracy in the operational characteristics of the resulting heads.

SUMMARY OF THE INVENTION

According to one aspect of the invention a method of reinforcing the pole face of a magnetic transducing head includes the step of providing an extension of predetermined dimensions around the pole face determining walls of a ferrite head block, the extension having a surface co-extensive with the pole face and being so dimensioned that it projects peripherally outwardly of the body of the head block said extension being formed from a non-magnetic material having a wear resistance and mechanical strength at least equal to that of the ferrite.

According to a second aspect of the invention a method of reinforcing the pole face of a magnetic transducing head includes the steps of pre-forming a head block reinforcing surround of predetermined dimensions from said non-magnetic material, the reinforcing surround having an aperture therethrough to accommodate the head block adjacent the pole face; locating the head block in the aperture so that one face of the reinforcing surround forms an extension of the pole face surface; and bonding the reinforcing surround to the head block while so positioned to reinforce the operative pole face.

According to a further aspect of the invention a magnetic transducing head includes a magnetic head block of ferrite, the head block having one face formed to provide an operative pole face; and a non-magnetic reinforcing member, having a wear resistance and mechanical strength comparable with that of the ferrite, secured to the head block so as to provide a surface surrounding and co-extensive with the pole face, the member being so dimensioned that it projects peripherally outwardly of the body of the head block.

BRIEF DESCRIPTION OF THE DRAWING

For a better understanding of the invention and to show how the same may be performed reference will now be made to the accompanying drawings in which.

DESCRIPTION OF THE PREFERRED EMBODIMENTS

Figure 1:
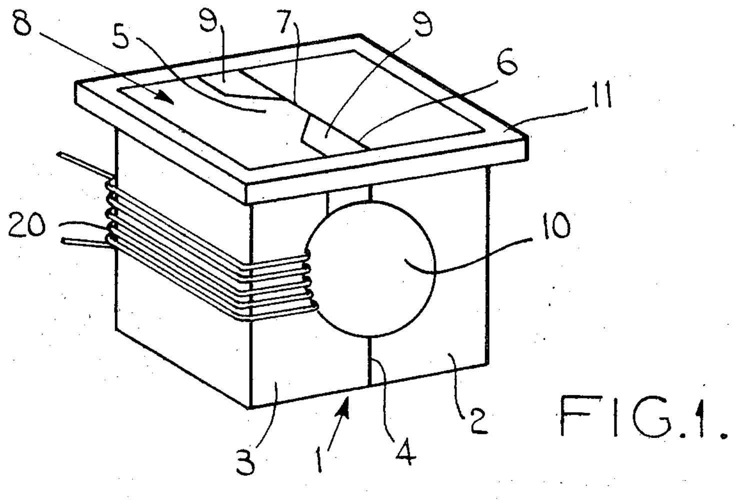
FIG. 1 is a diagrammatic perspective view of a head block of a magnetic transducing head having the pole face reinforced.

Referring first to FIG. 1 a head block 1 is formed from two elements 2, 3 each element being of a generally rectangular cross-section and formed from ferrite material. Part of one face 4 of the element 3 is cut away to form a narrow gap defining portion 5 when the elements 2, 3 are placed with the respective faces 4 and 6 in juxtaposition. The faces 4, 6 and the gap defining portion 5 are bonded together with glass in order to secure the elements 2, 3 together to form the composite head block 1. The bonding material between the face of portion 5 and the face 6 of element 2 provides a non-magnetic gap 7 lying perpendicular to the upper face of the head block 1 as seen in FIG. 1. The spaces 9 between the cut away portions of the element 3 and the opposing face 6 of the element 2 are also filled with glass during the bonding step.

A hole 10 is then drilled through the head block 1 by, for example, an ultrasonic drill to provide a space for accommodating a head winding 20. The upper face of the head block 1 is then lapped to form a flat operative pole face 8 which will be positioned adjacent to the surface of a magnetic recording medium (not shown) when the completed magnetic transducing head is in use. The completed head block 1 has a square cross-section in a plane parallel to the pole face 8 and has a pole face edge length of 0.100 inches.

A non-magnetic reinforcing surround 11 having a squaere cross-section of approximately 0.001 inches is positioned on the head block 1 so that the top surface of the surround 11 as can be seen in FIG. 1 is level with the pole face 8. The surround 11 is bonded to the head block 1, for example, by glass. The bonding material used for the bonding of the reinforcing surround must, of course, have a melting point lower than the minimum temperature at which the bonding material used for the non-magnetic gap 7 and the spaces 9 commences to distort. The reinforcing surround 11 entirely surrounds the operative pole face 8 of the head block 1 and is securely bonded to the head block 1. Accordingly, the surround 11 protects the edges and corners of the pole face 8 against wear which would otherwise occur when the head block is used in a magnetic transducing head assembly in the in-contact mode. Further, impact damage to the head block, due to accidental collision between the head block and minor irregularities in the surface of the magnetic recording medium is avoided.

It is important that the total pole face area of the magnetic head assembly which is in contact with the recording medium is known, that the area should be the same for all of the heads of a production batch and that the area should remain constant during the life of a head assembly to enable the correct loading to be applied to each head assembly. Since the external dimensions of a batch of reinforcing surrounds can be kept constant during production relatively easily, the desired uniformity of total area can be achieved economically. If the reinforcing surround is not used, the actual magnetic area of the pole face would have to be adjusted by, for example, lapping the sides of the head block which are perpendicular to the pole face. Such a step introduces a further source of potential damage. Further, since the reinforcing surround protects the edges and corners of the pole face against wear and crumbling of the ferrite, the uniformity over a period of use is considerably improved.

The reinforcing surround 11 may be made from many non-magnetic materials, both metallic and non-metallic, the main desiderata being, a wear resistance and mechanical strength at least comparable with that of the ferrite, the material should be compatible with or bondable to the ferrite and have a coefficient of expansion similar to that of the ferrite. Examples of non-metallic materials include glass, glass-ceramics and vitrified water-glass (a compound of $Na_2O$ and $Si\ O_2$), while examples of metallic materials suitable for the surround include copper, solder (an alloy of tin and lead), anodised aluminium and non-magnetic stainless steel.

It will be seen from the foregoing example that the width of the surround is relatively small compared with the dimensions of the pole face.

The reinforcing surrounds may be produced by moulding or casting or, for example when copper is used, the surrounds may be cut or stamped from a sheet or foil of the desired thickness.

The reinforcing surround 11 in the above example was produced as a separate operation from an easily fusible material, i.e., glass-ceramic. If desired the reinforcing surround may be produced by a casting or moulding technique directly onto the head block 1 providing the material used for the surround has a melting point below that of the material used to bond the elements 2, 3 together to form the non-magnetic gap 7 and to fill the spaces 9. If a material is used which has, for example a higher melting point than the bonding material there is a possibility that the head block 1 would be distorted.

Figure 2:
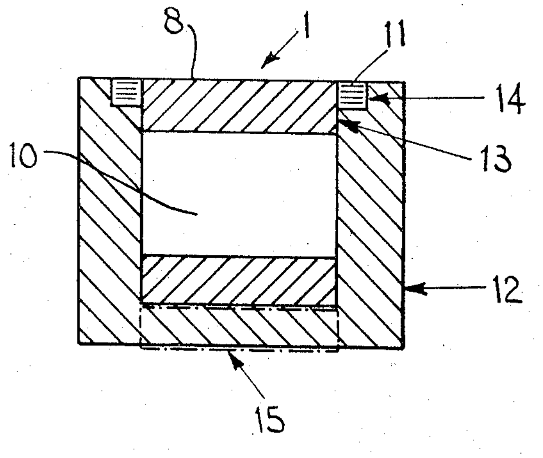
FIG. 2 is a section through a mould showing a cavity for moulding the non-magnetic reinforcing surround shown in FIG. 1.

Referring now to FIG. 2 a mould 12 has a cavity having one portion 13 of one dimensional area and a superposed second portion 14 having a larger dimensional area. The mould may be as shown, having a solid base to the cavity portion 13 or a removable and adjustable plug (shown in dotted line as reference numerial 15) may be used to close the base of the cavity portion 13.

The size and shape of the cavity portions 13, 14 is chosen such that a head block 1 may be accommodated in the mould 12 with the pole face 8 level with the open end of the mould 12. If desired the alignment of the pole face 8 may be obtained by adjustment of the plug 15. When a head block is positioned in the mould 12 the cavity portion 14 surrounds the portion of the head block 1 adjacent the pole face 8 and is dimensioned to the required size and shape of the required reinforcing surround 11. A suitable non-magnetic material for example, glass, is introduced into the cavity portion 14 to form the reinforcing surround 11 in situ, bonded to the head block 1. After the glass has set the reinforced head block 1 is removed from the mould 12.

It will be understood that if the head block 1 shown in the mould 12 of FIG. 2 is replaced by a mould core of the same dimensions as the head block, the cavity 14 is reproduced and the discrete reinforcing surrounds 11 may be cast in any required non-magnetic material. It is of course necessary to choose the materials for the mould 12 and mould core such that the moulding material does not adhere thereto or to coat in known manner the moulding surfaces of the cavity 14 to prevent adhesion of the moulding material.

The form of head block described herein when assembled in a magnetic transducing head assembly, is suitable for use as an in-contact reading, recording or erasing head in conjunction, for example with a magnetic disc. The transducing head is resiliently mounted so that it is maintained in contact with the surface of the disc despite any minor irregularity in the disc surface. A suitable resilient mounting includes a resilient diaphragm to which the transducing head is attached so that the pole face of the head projects from the mounting by a desired distance and means to create a cushion of pressurised air between the mounting and the magnetic disc recording surface so that the head is lightly maintained in contact with the recording surface. Such a resilient mounting is described in British Specification No. 1,276,004.

In some applications it is desirable that the transducing head should be aerodynamically flown out of contact with the surface of the magnetic recording medium such that a small space separates the pole face from the surface of the medium.

Transducing heads having reinforced head blocks constructed as described above are equally suitable for such operation, using a known type of head mounting. The uniformity of pole face area obtained by the construction described herein assists in ensuring uniformity of performance. The leading edge of the reinforcing surround and, if desired, the other edges also, may be lapped off at a very small angle, usually a few minutes of arc, to improve the aerodynamic properties of the head assembly.

Although wear is not a problem in out of contact operation, the reinforcing surround provides valuable protection for the edges and corners of the pole face in the event of accidental impact of the head assembly and the surface of, for example, a disc such as might occur during testing or malfunction of the head mounting system.

While in the foregoing example as shown in FIGS. 1 and 2 for the production of an in-contact head block the cross-section of the reinforcing surround 11 is relatively small (0.001 inch) compared with the dimensions of the pole face 8 (0.100 inch) it is to be understood that the dimension of the surface of the reinforcing surround is chosen according to the operational requirements of the finished transducing head assembly including the mode of use, that is as an in-contact head or as a transducing head which is aerodynamically flown out of contact with the magnetic recording medium.

It has been found that reinforcing surrounds having a dimension co-extensive with the pole face of 0.100 inch may be advantageously used with out of contact flying heads and in general, for a head block of a given size, an increase in the dimension of the reinforcing surround in the direction coextensive with the pole face tends to increase the spacing between the pole face surface and the recording medium while a decrease in this dimension tends to permit the transducing head to be aerodynamically flown close to the recording medium.

It will be understood that the head block need not be of generally rectangular form, nor the reinforcing surround of substantially square cross-section as shown in the drawings. The use of a reinforcing surround in the manner described is equally applicable to head blocks of other shapes. Similarly the use of reinforcing surrounds of other shapes and cross-sections may be advantageous in particular circumstances.

We claim:

1. A method of reinforcing the pole face of a magnetic transducing head having ferrite pole pieces separated by a non-magnetic gap arranged to form an operative pole face including the steps of preforming a reinforcing collar from non-magnetic material, the collar being formed with a pair of opposite faces and an aperture extending therethrough from one to the other of the faces, the dimensions of the aperture being arranged to permit the collar to be fitted about the operative pole face of the head; locating the head within the aperture of the collar to bring the operative pole face of the head into alignment with one of the faces of the collar; and bonding the head and the collar together so that the collar provides a reinforcement about said operative pole face.

2. A method as claimed in claim 1, in which the non-magnetic material is metallic.

3. A method as claimed in claim 2, in which the non-magnetic material is copper.

4. A method as claimed in claim 1, in which the non-magnetic material is non-metallic.

5. A method as claimed in claim 4, in which the non-magnetic material is a glass.

6. A magnetic transducing head including a head assembly having ferrite pole pieces separated by a non-magnetic gap arranged to form an operative pole face; and a preformed non-magnetic reinforcing collar having a wear resistance and mechanical strength comparable with that of the ferrite, the collar being formed with a pair of opposite faces and an aperture extending therethrough from one to the other of the faces, the dimensions of the aperture being arranged to permit the collar to be fitted about the operative pole face of the head; and in which the collar is bonded about the head assembly with one face of the collar being aligned with the operative face to form an extension thereto.

* * * * *